United States Patent [19]

Kumagai et al.

[11] Patent Number: 4,564,215
[45] Date of Patent: Jan. 14, 1986

[54] ELECTRONICALLY CONTROLLED SUSPENSION SYSTEM

[75] Inventors: Naotake Kumagai, Aichi; Minoru Tatemoto, Okazaki, both of Japan

[73] Assignee: Mitsubishi Jidosha Kogyo Kabushiki Kaisha, Tokyo, Japan

[21] Appl. No.: 636,145

[22] Filed: Jul. 31, 1984

[30] Foreign Application Priority Data

Aug. 19, 1983 [JP] Japan .................. 58-127276[U]

[51] Int. Cl.⁴ ................................. B60G 11/26
[52] U.S. Cl. ................................. 280/707; 364/424
[58] Field of Search .................. 280/703, 707, 714; 180/41; 267/64.16, 64.25; 364/424

[56] References Cited

U.S. PATENT DOCUMENTS 3,603,612 9/1971 Hill et al. ....................... 280/707
4,333,668 6/1982 Hendrickson et al. ........... 280/707

FOREIGN PATENT DOCUMENTS 2848286 5/1979 Fed. Rep. of Germany ...... 280/707

Primary Examiner—Joseph F. Peters, Jr.
Assistant Examiner—Ross Weaver
Attorney, Agent, or Firm—Robert E. Burns; Emmanuel J. Lobato; Bruce L. Adams

[57] ABSTRACT

An electronically controlled vehicle suspension system that can be switched between a hard and a soft state has a mode selection switch that permits an alternative choice between a hard mode that puts the suspension in the hard state and an automatic mode that automatically puts the suspension into the soft or hard state depending upon the vehicle conditions. A control device is also provided that puts the suspension in the automatic mode, in preference to the mode to which the mode selection switch has been set, when the engine key switch is turned on for the start. This electronically controlled suspension system is therefore always in the automatic mode when the engine has been started so that the suspension is automatically switched between the soft and hard states depending on the vehicle conditions, thereby assuring a comfortable ride at all times.

5 Claims, 3 Drawing Figures

ELECTRONICALLY CONTROLLED SUSPENSION SYSTEM

BACKGROUND OF THE INVENTION

1. Field of the Invention

This invention relates to an electronically controlled suspension system which is designed to take on an automatic mode when the engine key switch is turned on.

2. Description of the Prior Art

Electronically controlled automobile suspensions have been proposed that are electronically switched into a hard and a soft condition. This type of electronically controlled suspensions are equipped with a mode selection switch that permits an alternative choice between a hard mode that puts the suspension in the hard state and an automatic mode (hereinafter abbreviated as "auto mode") that automatically puts the suspension into the soft or hard state depending upon the conditions of automobile. When the auto mode is chosen, the suspension is normally in the soft state. It is only when a predetermined condition or conditions are met (for example, when the car speed exceeds a given limit) that the suspension automatically switches into a hard state. This provides a comfortable ride. The hard mode is chosen where a hard suspension is preferred as in running over such bumpy roads as those passing over mountains or by a driver who prefers his car to run at all times on a hard suspension rather than on a soft one.

When a car having this type of electronically controlled suspension equipped with a mode selection switch is started by turning on the engine key switch (KEY-ON), however, the car will continue to run on the suspension kept in a hard state if the mode selection switch is set to the hard mode, unless or until the driver turns the switch to the auto mode. In this state, even with a driver who prefers the more comfortable auto mode to the hard mode, the car will run on the hard suspension even under such road conditions as might probably be run with the soft suspension if the switch were set to the auto mode, unless the driver notices that the switch is at the hard mode, putting the driver to great discomfort.

SUMMARY OF THE INVENTION

This invention has been made to obviate the aforementioned problems with the conventional electronically controlled suspensions. The object of this invention is to provide an electronically controlled suspension system that assures improved riding comfort by making provision to make sure that the suspension is held in the auto mode, in which the suspension is normally kept in a soft state except under some predetermined conditions, when the engine key switch is turned on.

Accordingly, the suspension system according to this invention is designed to assume the auto mode in which the suspension is held in a soft state except under some predetermined conditions to ensure a comfortable ride, irrespective of the mode to which the mode selection switch has been set, when the engine key switch is turned on.

BRIEF DESCRIPTION OF THE DRAWINGS

The accompanying drawings illustrate a preferred embodiment of the electronically controlled suspension system according to this invention.

DETAILED DESCRIPTION OF THE PREFERRED EMBODIMENT

In the following is described a preferred embodiment of the electronically controlled suspension system according to this invention by reference to the accompanying drawings.

Figure 1:
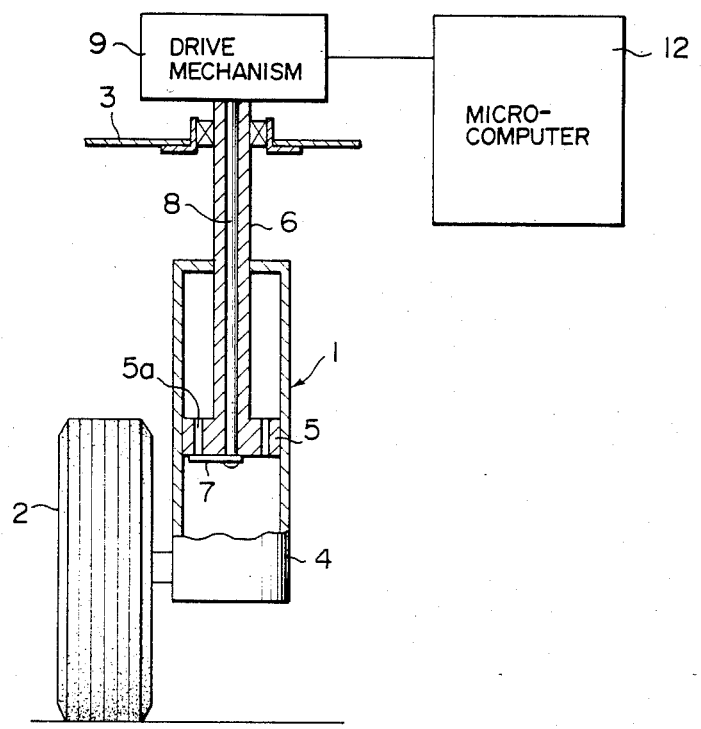
FIG. 1 is a schematic illustration of a suspension system according to this invention.

In FIG. 1, reference numeral 1 designates a suspension positioned between a wheel 2 and a car body 3. The suspension 1 consists of a cylinder 4 supporting the wheel 2, a piston rod 6 having a piston 5 fitted in the cylinder 4, a control rod 8 that actuates a valve 7 to open and close an orifice 5a in the piston 5, and a drive mechanism 9 that puts the control rod 8 into action. When the drive mechanism 9 causes the valve 7 to close the orifice 5a in the piston 5, the suspension 1 goes into a hard state. When the orifice 5a is open, the suspension 1 goes into a soft state. The suspension 1 is of the known type.

Figure 2:
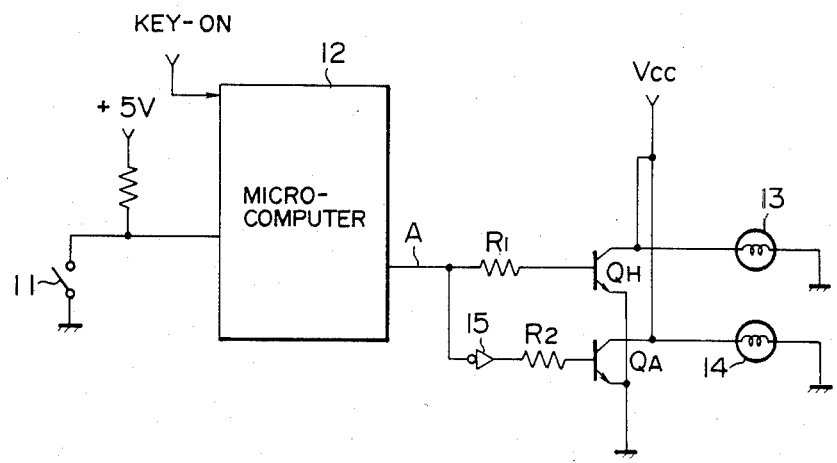
FIG. 2 shows a control circuit of the suspension system.

In FIG. 2, reference numeral 11 denotes a hard/auto (H/A) changeover switch functioning as a mode selection switch that makes an alternative choice between a hard and auto mode to put the suspension in the desired condition. The hard mode is chosen when the H/A changeover switch 11 is turned on, and the auto mode when the switch 11 is off. The operation signal of the H/A changeover switch is inputted in a microcomputer 12 that serves as a means to control the drive mechanism 9. Also inputted in the microcomputer 12 is a KEY-ON signal that is outputted when the engine key switch (not shown) is turned on.

A hard-mode indicating lamp 13 and an auto-mode indicating lamp 14 are provided under the control of the microcomputer 12 to indicate which of the hard and auto modes is chosen by the H/A changeover switch 11.

Here, $Q_H$ designates a transistor that turns on and off the hard-mode indicating lamp 13, $Q_A$ a transistor turning on and off the auto-mode indicating lamp 14, $R_1$ and $R_2$ resistors, and reference numeral 15 indicates an inverter.

That is, when the output line A goes low (or is at logic 0), the transistor $Q_H$ turns off to put on the hard-mode indicating lamp 13.

On the other hand, when the output line A goes high (or is at logic 1), the transistor $Q_A$ turns off to put on the auto-mode indicating lamp 14.

Figure 3:
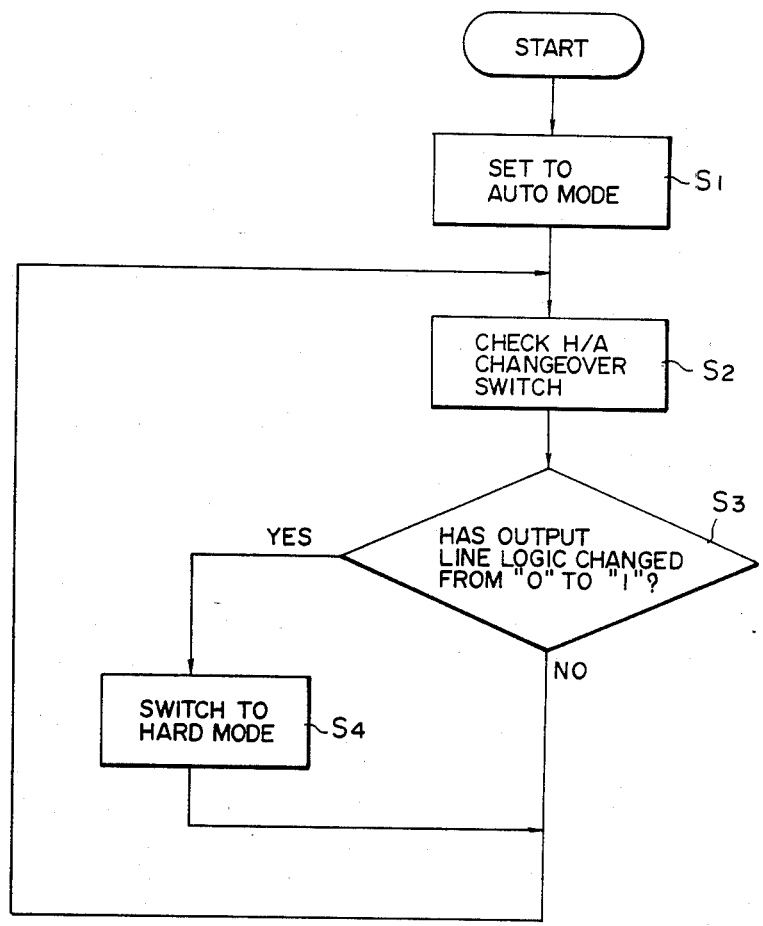
FIG. 3 is a flow chart illustrating how the suspension system is controlled.

As the electronically controlled suspension system of this invention is constructed as described above, turning on the engine key switch (not shown) causes the KEY-ON signal to be inputted in the microcomputer 12, whereupon the processing steps shown in the flowchart of FIG. 3, which are stored in the microcomputer 12, are carried out.

To be more specific, step $S_1$ sets the suspension to the auto mode or puts the suspension into a soft condition. At the same time, the logic level of the output line A becomes "1" to put on the auto-mode indicating lamp 14.

As a consequence, the suspension is in the soft state when the car is started, assuring a smooth and comfortable start.

At step $S_2$, the operation signal of the H/A changeover switch 11 is fed to the microcomputer 12 to check the condition of the switch 11. Then at step $S_3$, it is determined if the operation signal of the H/A changeover switch 11 has changed from logic 0 (the auto mode) to logic 1 (the hard mode). If it is found here that the operation signal has changed (i.e., when the check result is affirmative or "YES") or, in other words, the hard mode was chosen by the actuation of the H/A changeover switch 11 after the engine key switch had been turned on, the processing proceeds to step $S_4$ to put the suspension into a hard state. Then, the logic level of the output line A becomes "0" to put on the hard-mode indicating lamp 13.

Meanwhile, if the result obtained at step $S_3$ is negative ("NO"), indicating that no change has taken place, the operation loops back to step $S_2$ to repeat the operation.

What is claimed is:

1. In an electronically controlled suspension system equipped with a mode selection switch that permits an alternative choice between a hard mode that puts a vehicle suspension in a hard state and an automatic mode that automatically puts the suspension into a soft state or a hard state depending upon the vehicle conditions, the improvement which comprises control means putting the suspension in the automatic mode when the engine key switch of a vehicle is turned on in preference to the mode to which said mode selection switch has been set.

2. The improvement according to claim 1, in which said control means switches the suspension held in the automatic mode into the hard mode when the mode selection switch is switched from the automatic mode to the hard mode.

3. The improvement according to claim 1, in which a mode indicating lamp to indicate the mode chosen by the control means is provided.

4. The improvement according to claim 3, in which said mode indicating lamp is a hard-mode indicating lamp that lights on when the suspension is in the hard mode.

5. The improvement according to claim 3, in which said mode indicating lamp is an automatic-mode indicating lamp that lights on when the suspension is in the automatic mode.

* * * * *